United States Patent
Sunil Kumar et al.

(10) Patent No.: US 10,503,171 B2
(45) Date of Patent: Dec. 10, 2019

(54) METHOD AND SYSTEM FOR DETERMINING DRIVABLE NAVIGATION PATH FOR AN AUTONOMOUS VEHICLE

(71) Applicant: WIPRO LIMITED, Bangalore (IN)

(72) Inventors: Balaji Sunil Kumar, Bengaluru (IN); Manas Sarkar, Kolkata (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 152 days.

(21) Appl. No.: 15/719,674

(22) Filed: Sep. 29, 2017

(65) Prior Publication Data
US 2019/0056739 A1    Feb. 21, 2019

(30) Foreign Application Priority Data
Aug. 17, 2017 (IN) .............................. 201741029192

(51) Int. Cl.
*G05D 1/00* (2006.01)
*G06K 9/00* (2006.01)
(Continued)

(52) U.S. Cl.
CPC .......... *G05D 1/0088* (2013.01); *G01C 21/30* (2013.01); *G01S 17/89* (2013.01); *G05D 1/0212* (2013.01);
(Continued)

(58) Field of Classification Search
CPC .. G05D 1/0088; G05D 1/0212; G05D 1/0268; G05D 1/0278; G05D 2201/0213; G01C 21/30; G01S 17/89; G06K 9/00791
See application file for complete search history.

(56) References Cited

U.S. PATENT DOCUMENTS

| 8,670,592 B2 | 3/2014 | Zhang | |
|---|---|---|---|
| 2007/0219720 A1* | 9/2007 | Trepagnier | B60W 30/00 701/300 |

(Continued)

OTHER PUBLICATIONS

Wang, L., et al., "3D-LIDAR based Branch Estimation and Intersection Location for Autonomous Vehicles", (2017), IEEE Intelligent Vehicles Symposium (IV), pp. 1440-1445.
(Continued)

*Primary Examiner* — Aaron L Troost
(74) *Attorney, Agent, or Firm* — Finnegan, Henderson, Farabow, Garrett & Dunner, LLP

(57) ABSTRACT

This disclosure relates generally to autonomous vehicle, and more particularly to method and system for determining a drivable navigation path for an autonomous vehicle. In one embodiment, a method may be provided for determining a drivable navigation path for the autonomous vehicle. The method may include receiving a base navigation path on a navigation map, a position and an orientation of the autonomous vehicle with respect to the base navigation path, and an environmental field of view (FOV). The method may further include deriving a navigational FOV based on the environmental FOV, the base navigation path, and the orientation of the vehicle. The method may further include determining a set of navigational data points from the navigational FOV, and generating at least a portion of the drivable navigation path for the autonomous vehicle based on the set of navigational data points.

16 Claims, 10 Drawing Sheets

(51) Int. Cl.
G05D 1/02 (2006.01)
G01C 21/30 (2006.01)
G01S 17/89 (2006.01)

(52) U.S. Cl.
CPC ......... *G05D 1/0268* (2013.01); *G05D 1/0278* (2013.01); *G06K 9/00791* (2013.01); *G05D 2201/0213* (2013.01)

(56) References Cited

U.S. PATENT DOCUMENTS

| | | | | |
|---|---|---|---|---|
| 2016/0313133 | A1* | 10/2016 | Zeng | B60W 30/18163 |
| 2016/0375901 | A1* | 12/2016 | Di Cairano | B60W 30/09 |
| | | | | 701/26 |
| 2017/0123434 | A1 | 5/2017 | Urano et al. | |
| 2018/0202822 | A1* | 7/2018 | DeLizio | G01C 21/3438 |

OTHER PUBLICATIONS

Extended European Search Report issued in the European Patent Office in counterpart European Application No. 17209094.6, dated Jul. 5, 2018, 7 pages.

Levinson, J., et al, "Map Based Precision Vehicle Localization in Urban Environments", 8 pages.

\* cited by examiner

METHOD AND SYSTEM FOR DETERMINING DRIVABLE NAVIGATION PATH FOR AN AUTONOMOUS VEHICLE

TECHNICAL FIELD

This disclosure relates generally to autonomous vehicle, and more particularly to method and system for determining a drivable navigation path for an autonomous vehicle.

BACKGROUND

Autonomous vehicles may facilitate efficient transportation in coming times. The autonomous vehicle may be capable of sensing the dynamic changing environment, and of navigating without any human intervention. The task of navigation of autonomous vehicle may be therefore of utmost importance, and may typically require combination of three basic abilities: localization, path planning, and vehicle control. The localization may determine current position (location) and orientation (pose or direction) of the autonomous vehicle within a global reference frame. The path planning may determine the path and the sequence of command velocity required by the autonomous vehicle to reach the desired destination from its current position. The planned path may be followed by the autonomous vehicle using feedback controller system, which may include dynamic obstacle avoidance as well as global path (pre/re) planning.

As will be appreciated, the global path may be a pre-generated path using standard algorithm. However, path planning may depend on accurate map of the territory where the vehicle may eventually run. Mapping of the locality may require a huge effort. Further, maintaining and updating the mapped locality with all its continuous changes may require effort and storage space on server, and may also involve cost. Thus, existing techniques to provide high precision map and accurate navigation path for autonomous vehicle are effort and resource intensive, and involve huge cost.

In one embodiment, a method for determining a drivable navigation path for an autonomous vehicle is disclosed. In one example, the method may include receiving a base navigation path on a navigation map, a position and an orientation of the autonomous vehicle with respect to the base navigation path, and an environmental field of view (FOV). The method may further include deriving a navigational FOV based on the environmental FOV, the base navigation path, and the orientation of the vehicle. The method may further include determining a set of navigational data points from the navigational FOV. The method may further include generating at least a portion of the drivable navigation path for the autonomous vehicle based on the set of navigational data points.

In one embodiment, a system for determining a drivable navigation path for an autonomous vehicle is disclosed. In one example, the system may include at least one processor and a memory communicatively coupled to the at least one processor. The memory may store processor-executable instructions, which, on execution, may cause the processor to receive a base navigation path on a navigation map, a position and an orientation of the autonomous vehicle with respect to the base navigation path, and an environmental field of view (FOV). The processor-executable instructions, on execution, may further cause the processor to derive a navigational FOV based on the environmental FOV, the base navigation path, and orientation of the vehicle. The processor-executable instructions, on execution, may further cause the processor to determine a set of navigational data points from the navigational FOV. The processor-executable instructions, on execution, may further cause the processor to generate at least a portion of the drivable navigation path for the autonomous vehicle based on the set of navigational data points.

In one embodiment, a non-transitory computer-readable medium storing computer-executable instructions for determining a drivable navigation path for an autonomous vehicle is disclosed. In one example, the stored instructions, when executed by a processor, may cause the processor to perform operations including receiving a base navigation path on a navigation map, a position and an orientation of the autonomous vehicle with respect to the base navigation path, and an environmental field of view (FOV). The operations may further include deriving a navigational FOV based on the environmental FOV, the base navigation path, and the orientation of the vehicle. The operations may further include determining a set of navigational data points from the navigational FOV. The operations may further include generating at least a portion of the drivable navigation path for the autonomous vehicle based on the set of navigational data points.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
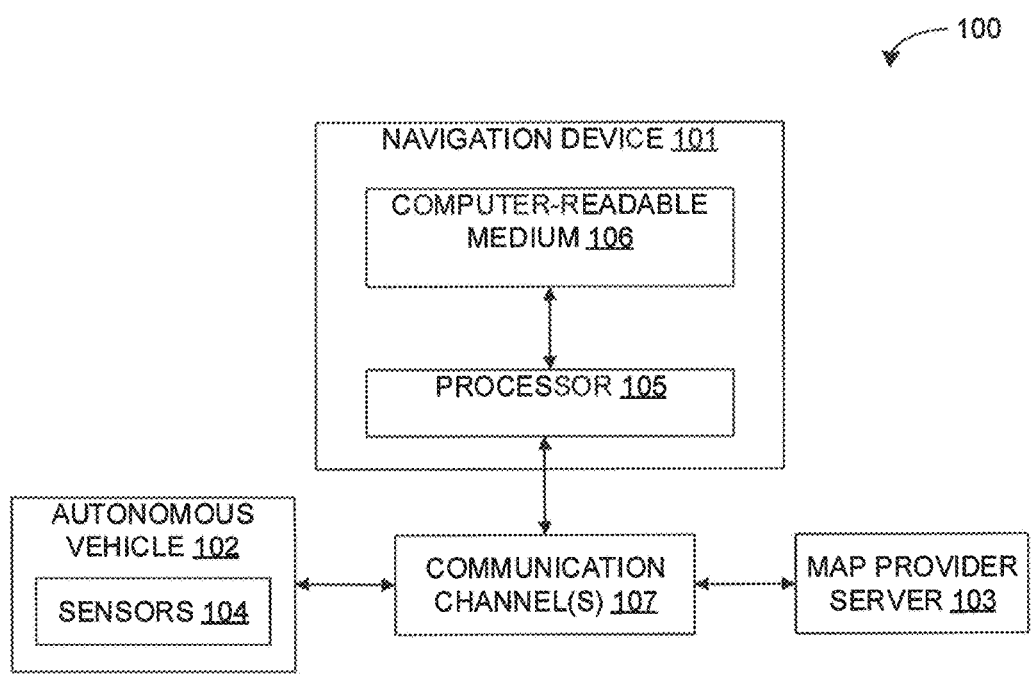
FIG. 1 is a block diagram of an exemplary system for determining a drivable navigation path for an autonomous vehicle in accordance with some embodiments of the present disclosure.

Referring now to FIG. 1, an exemplary system 100 for determining a drivable navigation path for an autonomous vehicle is illustrated in accordance with some embodiments of the present disclosure. In particular, the system 100 may include a navigation device 101, an autonomous vehicle 102, and a map provider server 103. The navigation device 101 may receive a base navigation path on a navigation map from the map provider server 103, and may generate a drivable navigation path for the autonomous vehicle 102. As will be appreciated by those skilled in the art, the map provider server 103 may be a server of any service provider (e.g., GOOGLE, OPENSTREETMAP, etc.) that may provide the navigation map (i.e., a geographic map of the region) along with the base navigation path (high-level navigation map that may not be very accurate) between a source and a destination. It should be noted that, in some embodiments, the base navigation path may be in terms of geographic coordinate point array for the navigation device 101.

Further, as will be appreciated by those skilled in the art, the autonomous vehicle 102 may be any vehicle capable of sensing the dynamic changing environment, and of navigating without any human intervention. Thus, the autonomous vehicle 102 may include at least a number of sensors 104, a vehicle drivetrain, and a processor based control system, among other components. The one or more sensors 104 may enable sensing the dynamic changing environment, and may include a global positioning system (GPS) sensor, an inertia measurement unit (IMU), a laser scanner, a light detection and ranging (LIDAR) scanner, a short range radar, a camera, an ultrasonic sensor, and so forth. The one or more sensors 104 may capture various sensor parameters such as current position (location) and orientation (pose or direction) of the autonomous vehicle 102 within a global reference frame, a 360 degree field of view (FOV) of the environment, an image of the environment, a presence of any other object in the vicinity of the autonomous vehicle 102, and so forth. As will be appreciated, the sensor parameters may enable the navigation device 101 to generate the drivable navigation path for the autonomous vehicle 102. The processor based control system may receive sensors parameters from the sensors 104 so as to identify appropriate navigation path and obstacle of the dynamically changing environment. The processor based control system may process sensor data, and may accordingly control the vehicle drivetrain.

As will be appreciated, the autonomous vehicle 102 may not be able to navigate on high level navigation path provided by the map provider server 103. The navigation device 101 may therefore implement a drivable navigation path determination engine for generating the drivable navigation path for the autonomous vehicle 102 in accordance with some embodiments of the present disclosure. As will be described in greater detail in conjunction with FIG. 2, the drivable navigation path determination engine may receive a base navigation path on a navigation map from the map provider server 103, a position and an orientation of the autonomous vehicle 102 with respect to the base navigation path from the sensors 104, and an environmental FOV from the sensors 104. The drivable navigation path determination engine may further derive a navigational FOV based on the environmental FOV, the base navigation path, and the orientation of the vehicle 102. The drivable navigation path determination engine may further determine a set of navigational data points from the navigational FOV, and may generate at least a portion of the drivable navigation path for the autonomous vehicle 102 based on the set of navigational data points.

The navigation device 101 may include one or more processors 105, and a computer-readable medium (e.g., a memory) 106. The computer-readable medium 106 may store instructions that, when executed by the one or more processors 105, may cause the one or more processors 105 to generate the drivable navigation path for the autonomous vehicle 102 in accordance with aspects of the present disclosure. The computer-readable storage medium 106 may also store multiple system parameters captured by the sensors 104 and other data as required or as processed by the navigation device 101 or the system 100. The one or more processors 105 may perform data processing functions so as to receive the base navigation path, receive environmental FOV, derive navigational FOV, determine navigational data points, and generate drivable navigation path.

Each of the navigation device 101, the autonomous vehicle 102, and the map provider server 103 may interact among each other over various communication channels 107. For example, in some embodiments, the navigation device 101 may receive navigation map along with base navigation path from the map provider server 103 over a communication channel 107, and may receive sensor parameters from the autonomous vehicle 102 over a separate communication channel 107. Alternatively, in some embodiments, the autonomous vehicle 102 may receive navigation map along with base navigation path from the map provider server 103 over a communication channel 107, while the navigation device 101 may receive sensor parameters as well as navigation map along with base navigation path from the autonomous vehicle 102 over a separate communication channel 107. Further, in some embodiments, the autonomous vehicle 102 may receive drivable navigation path from the navigation device 101 over the communication channel 107. In some embodiments, the autonomous vehicle 102 may also receive navigation map along with base navigation path from the navigation device 101 over the communication channel. Alternatively, in some embodiments, the autonomous vehicle 102 may receive navigation instructions (e.g., navigation path and sequence of command velocity) from the navigation device 101. The communication channel 108 may be any wired or wireless communication channel based on different communication technologies (e.g., satellite communication technology, television communication technology, mobile communication technologies, WiFi, WiMax, optical fibre, coaxial cable, universal serial bus (USB), high-definition multimedia interface (HDMI), Bluetooth, and so forth).

As will be appreciated, in some embodiments, the navigation device 101 may be located locally with respect to the autonomous vehicle 102. For example, in some embodiments, the navigation device 101 may be a separate device in communication with the autonomous vehicle 102. Alternatively, in some embodiments, the navigation device 101 may be embedded within the autonomous vehicle 102. Further, as will be appreciated, in some embodiments, the navigation device 101 may be located remotely with respect to the autonomous vehicle 102. For example, in some embodiments, the navigation device 101 may be located in a remote server of a navigation service provider. Alternatively, in some embodiments, the navigation device 101 may be embedded within the map provider server 103.

Further, as will be appreciated, in some embodiments, various components of the navigation device 101 may be physically located together in one device. Alternatively, in some embodiments, the components of the navigation device 101 may be physically distributed across various devices. For example, the processors 105 and the computer readable medium 106 of the navigation device 101 may be physically located together in one device (e.g., the navigation device 101) or may be physically distributed across various devices (e.g., the navigation device 101, the autonomous vehicle 102, and/or the map provider server 103). Similarly, in some embodiments, some or all of the sensors 104 may be a part of the navigation device 101 even though they may be located in the autonomous vehicle 102.

Figure 2:
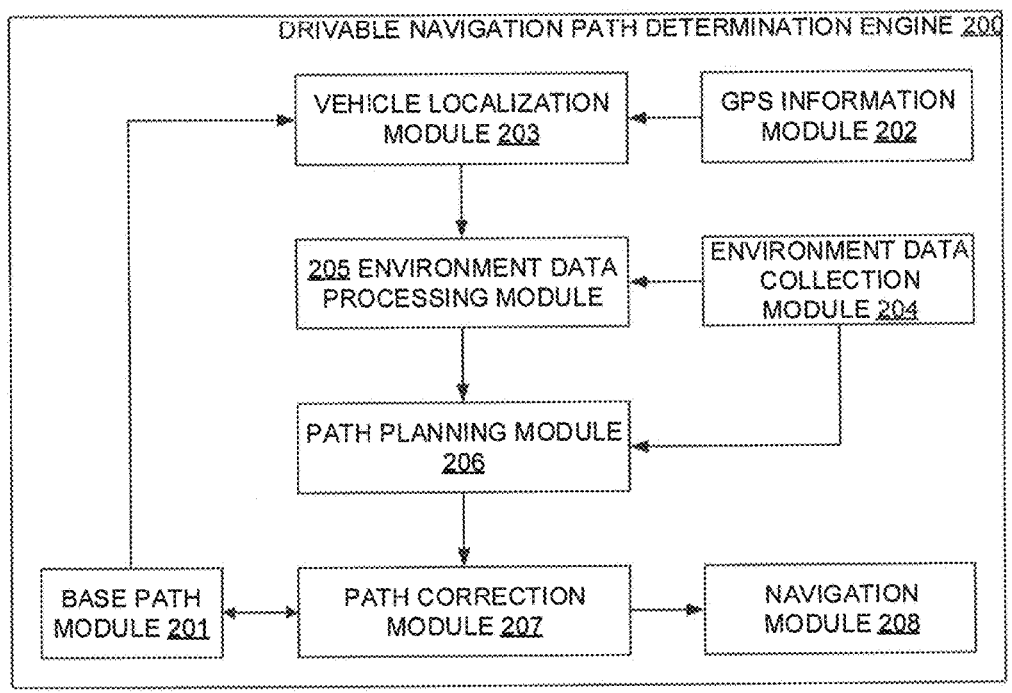
FIG. 2 is a functional block diagram of a drivable navigation path determination engine in accordance with some embodiments of the present disclosure.

Referring now to FIG. 2, a functional block diagram of the drivable navigation path determination engine 200 implemented by the navigation device 101 of the system 100 of FIG. 1 is illustrated in accordance with some embodiments of the present disclosure. The drivable navigation path determination engine 200 may include various modules that perform various functions so as to generate the drivable navigation path for the autonomous vehicle. In some embodiments, the drivable navigation path determination engine 200 includes a base path module 201, a GPS information module 202, a vehicle localization module 203, an environment data collection module 204, an environment data processing module 205, a path planning module 206, a path correction module 207, and a navigation module 208. As will be appreciated by those skilled in the art, each of the modules 201-208 may reside, in whole or in parts, on any of the navigation device 101 and the autonomous vehicle 102.

The base path module 201 may receive the base navigation path between a source and a destination on the navigation map (e.g., navigation path on GOOGLE map) from the map provider server or from a local storage. It should be noted that the base navigation path on the navigation map in the local storage may be from the map provider server either from an earlier instance or from a prior request (e.g., prior to start of the navigation). Further, as stated above, in some embodiments, the navigation path may be in terms of geographic coordinate point array. The base path module 201 may then provide the base navigation path on the navigation map to the vehicle localization module 203 and to the path correction module 207.

The GPS information module 202 may receive GPS data (i.e., latitude, longitude) of the autonomous vehicle through the GPS sensor. As will be appreciated, GPS data provide geographical information regarding the position of the GPS sensor. The GPS information module 202 may then convert the received GPS data into x, y (east, north) on a universal transverse Mercator (UTM) coordinate system. As will be appreciated, UTM coordinate system may employ a two-dimensional Cartesian coordinate system to provide location on the surface of the Earth. The GPS information module 202 may then provide the converted GPS data to the vehicle localization module 203.

The vehicle localization module 203 may receive the converted GPS data from the GPS information module 202, and the base navigation path on the navigation map from the base path module 201. The vehicle localization module 203 may then localize the autonomous vehicle with respect to the base navigation on the navigation map. The localization involves determining a position of the vehicle (based on the GPS data received from the GPS information module 202), and determining an orientation (i.e., direction or pose) of the autonomous vehicle (based on data received from the IMU) with respect to the base navigation path on the navigation map (received from the base path module 201). As will be appreciated, IMU data records the precise orientation of the IMU sensor at that location. The vehicle localization module 203 may then provide the position and the orientation of the autonomous vehicle with respect to the base navigation path on the navigation map to the environment data processing module 205.

The environment data collection module 204 may receive environment data captured through different sensors (e.g., laser scanner, LIDAR scanner, short range radar, camera, ultrasonic sensor, etc.). The environment data collection module 204 may then construct the environmental FOV from the environment data, and may provide the environmental FOV to the environment data processing module 205.

The environment data processing module 205 may receive the environment FOV from the environment data collection module 204, and the position and the orientation of the autonomous vehicle with respect to the base navigation path on the navigation map from the vehicle localization module 203. The environment data processing module 205 may then derive a navigational FOV based on the environmental FOV, the base navigation path, and the orientation of the vehicle. For example, the navigation FOV may be a FOV of interest (e.g., movable road distance ahead) with sufficient data points by filtering out rest of the data points from the environmental FOV. Thus, the environment data processing module 205 may cluster data points from the navigation FOV. The environment data processing module 205 may then provide the clustered data points to the path planning module 206.

The path planning module 206 may receive the clustered data points from the environment data processing module 205. The path planning module 206 may then determine navigational data points from the clustered data points. For example, the path planning module 206 may filter surface data points (e.g., road data points) from the clustered data points based on their corresponding elevation level at predetermined distance intervals along the navigational FOV (e.g., movable road distance ahead). The path planning module 206 may then filter navigational data points from the surface data points based on their corresponding substantially central positions at each of the pre-determined distance intervals along the navigational FOV. Thus, the path planning module 206 may extract substantially center of the road data points. The path planning module 206 may then generate a portion of the drivable navigation path for the autonomous vehicle based on the set of navigational data points. For example, the path planning module 206 may generate the drivable navigation path from the position of the autonomous vehicle to the end of navigational FOV of the autonomous vehicle using curve fitting along the navigational data points. The drivable navigation path may be the path for movement of the autonomous vehicle. The path planning module 206 may further provide the drivable navigation path to the path correction module 207.

The path correction module 207 may receive the base navigation path on the navigation map from the base path module 201, and the generated drivable navigation path from the path planning module 206. The path correction module 207 may then compare the drivable navigation path with the base navigation path for determining a best matching segment. The path correction module 207 may also take into consideration the vehicle localization module's 203 tentative localization information so as to estimate the start of the path segment on base navigation path. Upon identifying the matching segment on the base navigation path, the start position of the base navigation path segment may be considered to be the vehicle correct localized position. As will be appreciated, in some embodiments, the x, y (east, north) data may be converted back to GPS data (lat, lng) for visualization. The path correction module 207 may further provide the start position and the drivable navigation path to the navigation module 208.

The navigation module 208 may receive the start position and the drivable navigation path from the path correction module 207. The navigation module 208 may then determine a local plan for navigating the autonomous vehicle based on the start position and the drivable navigation path. For example, the navigation module 208 may determine a command velocity for the autonomous vehicle based on a corrected local plan. The navigation module 208 may then provide the navigation path and sequence of command velocities to the vehicle control system for navigating the autonomous vehicle.

It should be noted that the drivable navigation path determination engine 200 may be implemented in programmable hardware devices such as programmable gate arrays, programmable array logic, programmable logic devices, and so forth. Alternatively, the drivable navigation path determination engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for determining a drivable navigation path for an autonomous vehicle. For example, the exemplary system 100 and the associated drivable navigation path determination engine 200 may determine drivable navigation path for the autonomous vehicle by the processes discussed herein. In particular, as will be appreciated by those of ordinary skill in the art, control logic and/or automated routines for performing the techniques and steps described herein may be implemented by the system 100 and the associated drivable navigation path determination engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
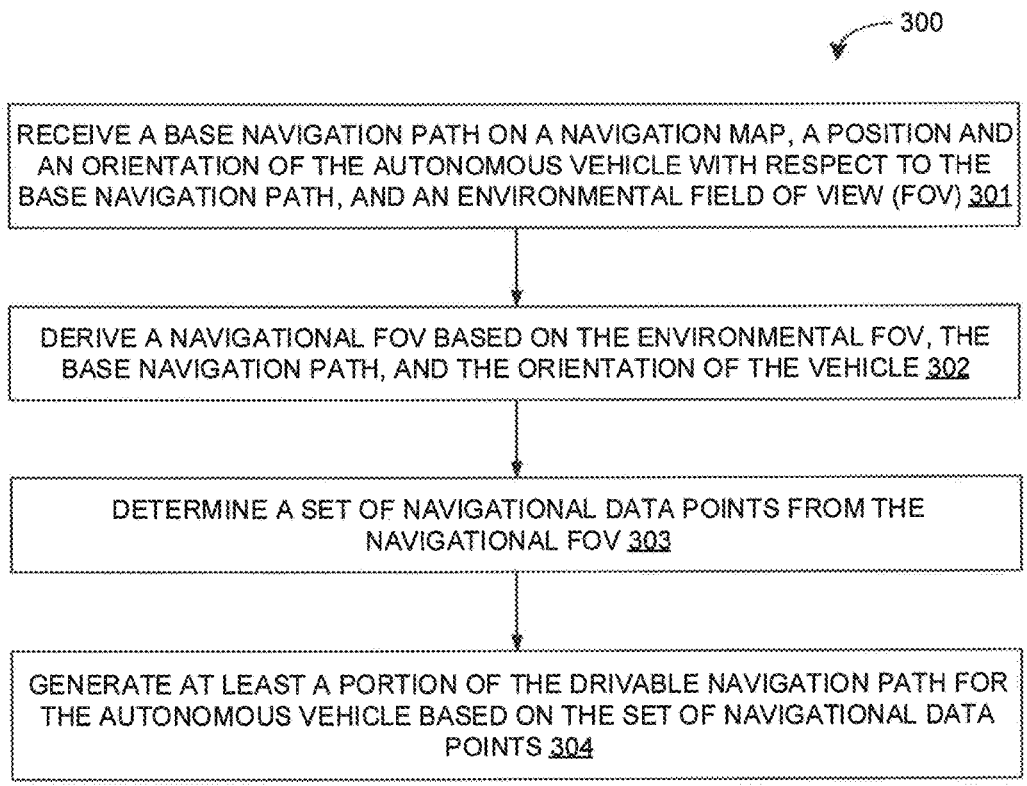
FIG. 3 is a flow diagram of an exemplary process for determining a drivable navigation path for an autonomous vehicle in accordance with some embodiments of the present disclosure.

For example, referring now to FIG. 3, exemplary control logic 300 for determining a drivable navigation path for an autonomous vehicle via a system, such as system 100, is depicted via a flowchart in accordance with some embodiments of the present disclosure. As illustrated in the flowchart, the control logic 300 may include the step of receiving a base navigation path on a navigation map, a position and an orientation of the autonomous vehicle with respect to the base navigation path, and an environmental field of view (FOV) at step 301. The control logic 300 may further include the step of deriving a navigational FOV based on the environmental FOV, the base navigation path, and the orientation of the vehicle at step 302. The control logic 300 may further include the steps of determining a set of navigational data points from the navigational FOV at step 303, and generating at least a portion of the drivable navigation path for the autonomous vehicle based on the set of navigational data points at step 304.

In some embodiments, the base navigation path may be received from a global positioning system (GPS) based navigation path service provider. Additionally, in some embodiments, the position of the autonomous vehicle may be received from a GPS sensor. Further, in some embodiments, the orientation of the autonomous vehicle may be received from an inertia measurement unit (IMU). Moreover, in some embodiments, the environmental FOV may be received from a light detection and ranging (LIDAR) scanner.

In some embodiments, deriving the navigational FOV at step 302 may include the step of determining an approachable volume based on a plurality of geometrical parameters of the environmental FOV, an orientation of the base navigation path, and the orientation of the autonomous vehicle. Additionally, in some embodiments, the plurality of geometrical parameters may include a range of LIDAR measurement, a horizontal angle of LIDAR beam elevation, a vertical angle of LIDAR beam elevation, and a height of LIDAR from the ground. Further, in some embodiments, determining the approachable volume may include the steps of determining a deviation in the orientation based on the orientation of the base navigation path and the orientation of the autonomous vehicle, and determining a scope of the environmental FOV based on the deviation. Moreover, in some embodiments, deriving the navigational FOV at step 302 may further include the step of filtering a navigational volume from the approachable volume. It should be noted that the navigational volume may include a drivable area and a plurality of non-drivable structures in the vicinity of the drivable area.

In some embodiments, determining the set of navigational data points at step 303 may include the step of determining a plurality of data points within the navigational FOV. Additionally, in some embodiments, determining the set of navigational data points at step 303 may include the step of filtering a plurality of surface data points from the plurality of data points based on their corresponding elevation level and their corresponding base elevation level along each of a plurality of pre-determined distance intervals in the navigational FOV. It should be noted that a base elevation level may be an elevation on which the surface of the drivable navigation path may substantially adhere to. Further, in some embodiments, determining the set of navigational data points at step 303 may include the step of filtering the set of navigational data points from the plurality of surface data points based on their corresponding substantially central positions along each of a plurality of pre-determined distance intervals in the navigational FOV.

In some embodiments, generating at least the portion of the drivable navigation path at step 304 may include the step of curve fitting along the set of navigational data points. Additionally, in some embodiments, the control logic 300 may further include the step of navigating the autonomous vehicle based on at least the portion of the drivable navigation path. Further, in some embodiments, navigating the autonomous vehicle may include the steps of determining an offset between at least the portion of the drivable navigation path and a corresponding portion of the base navigation path, and correcting the navigation of the autonomous vehicle based on the base navigation path and the offset.

Figure 4A:
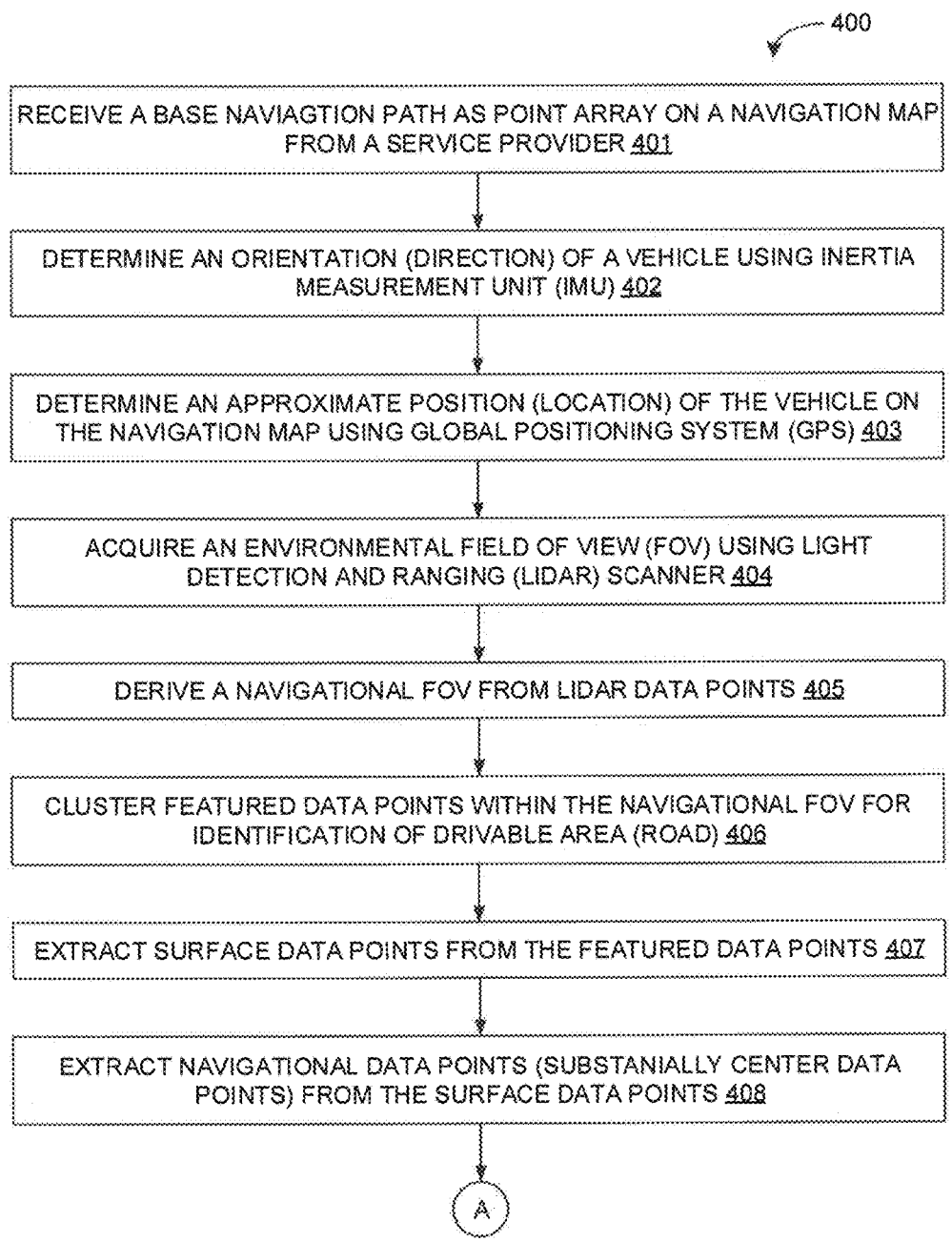
FIGS. 4A and 4B are flow diagrams of a detailed exemplary process for determining a drivable navigation path for an autonomous vehicle in accordance with some embodiments of the present disclosure.
Figure 4B:
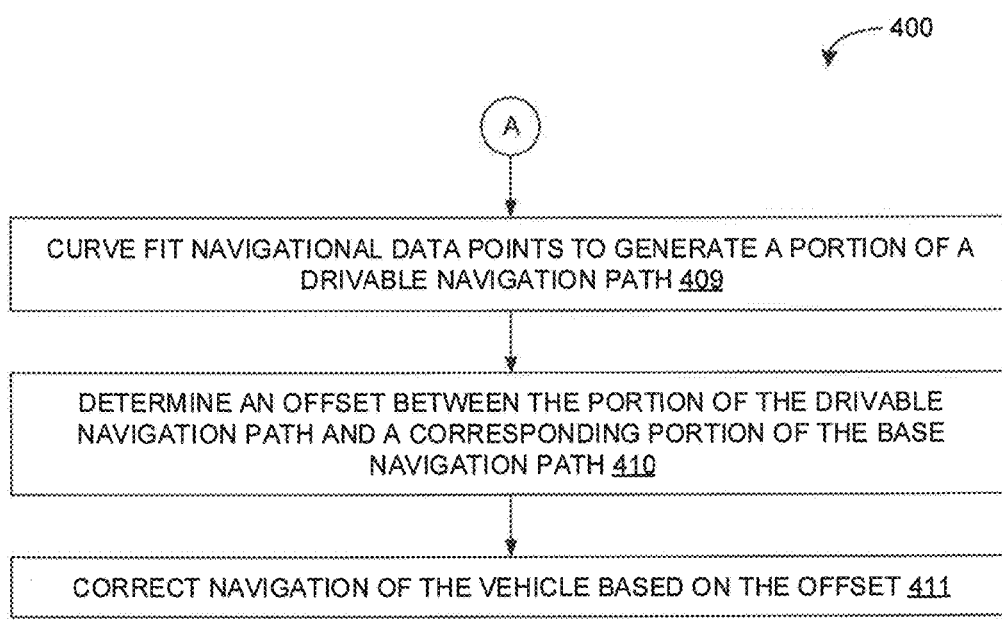

Referring now to FIGS. 4A and 4B, exemplary control logic 400 for determining a drivable navigation path for an autonomous vehicle is depicted in greater detail via a flowchart in accordance with some embodiments of the present disclosure. As illustrated in the flowchart, the control logic 400 may include the steps of receiving a base navigation path as point array on a navigation map from a service provider at step 401, determining an orientation (i.e., direction or pose) of the autonomous vehicle with respect to the navigation map using IMU at step 402, and determining an approximate position (i.e., location) of the autonomous vehicle with respect to the navigation map using GPS sensor at step 403. The control logic 400 may further include the steps of acquiring an environmental FOV using LIDAR scanner at step 404, and deriving a navigational FOV from LIDAR data points at step 405.

The control logic 400 may further include the steps of clustering featured data points within the navigation FOV for identification of drivable area (e.g., road) at step 406, extracting surface data points from the featured data points at step 407, extracting navigational data points (e.g., substantially center data points) from the surface data points at step 408, and curve fitting navigational data points to generate a portion of the drivable navigation path at step 409. The control logic 400 may further include the step of navigating the autonomous vehicle based on at least the portion of the drivable navigation path by determining an offset between the portion of the drivable navigation path and a corresponding portion of the base navigation path at step 410, and correcting the navigation of the autonomous vehicle based on the offset at step 411. Each of the steps will be described in greater detail herein below.

At step 401, the navigation device may receive a base navigation path on a geographic navigation map from any standard service provider such as GOOGLE, OPENSTREETMAP, etc. The navigation path may be provided as (latitude, longitude) point array such as [lat (G_Lat (i)), lng (G_Long (i))]. The navigation device may then convert the (latitude, longitude) point array to the UTM coordinate system as (east, north) point array such as [east (G_UTM_East (i)), north (V_UTM_North (i))] respectively. The converted data may then be stored in the navigation device. At step 402, the navigation device may determine the orientation of the vehicle (VehDtrn_Orntn) based on the orientation data received from IMU sensor. At step 403, the navigation device may determine an initial location of the autonomous vehicle. The navigation device may receive the map information from storage. Further, the navigation device may receive GPS data (V_lat, V_long) for the autonomous vehicle location, and may convert the GPS data to the to UTM coordinate system as (V_UTM_north, V_UTM_east). The navigation device may then determine the approximate vehicle location (VehLoc$_{Apprx}$) on the map.

At step 404, the navigation device may receive LIDAR data (Lidar$_{Data}$) representing the environmental FOV from LIDAR scanner. At step 405, the navigation device may process the LIDAR data (Lidar$_{Data}$) so as to derive the navigational FOV. The navigational FOV may include a drivable area (e.g., road) and structures in the vicinity of the drivable area (e.g., buildings or trees on the roadside).

Figure 5A:
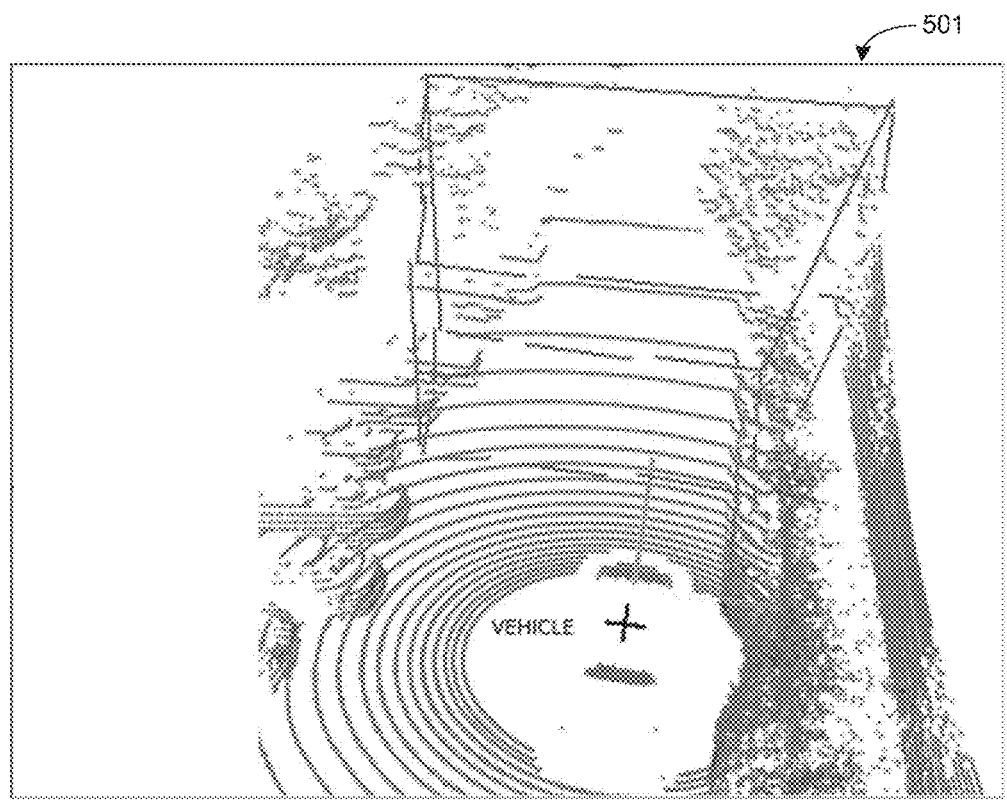
FIGS. 5A and 5B illustrate an exemplary environmental field of view (FOV) and an exemplary navigational FOV in accordance with some embodiments of the present disclosure.
Figure 5B:
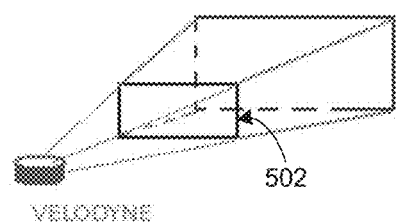

Referring now to FIGS. 5A and 5B, an exemplary environmental FOV 501 and an exemplary navigational FOV 502 are illustrated in accordance with some embodiments of the present disclosure. It should be noted that the navigation FOV 502 is a trapezoidal volume marked within the environmental FOV 501. As will be appreciated, LIDAR data points cloud or simply the LIDAR data (Lidar$_{Data}$) received from the LIDAR scanner at step 404 may represent the environmental FOV 501, while a trapezoidal volume (shown within the LIDAR data points cloud) derived after processing the LIDAR data (Lidar$_{Data}$) at step 405 may represent the navigational FOV 502. Further, as illustrated, the trapezoidal volume representing the navigational FOV may include drivable area data points (e.g., road data points) as well as data points of structures in the vicinity of the drivable area (e.g., buildings or trees on the roadside).

Figure 6A:
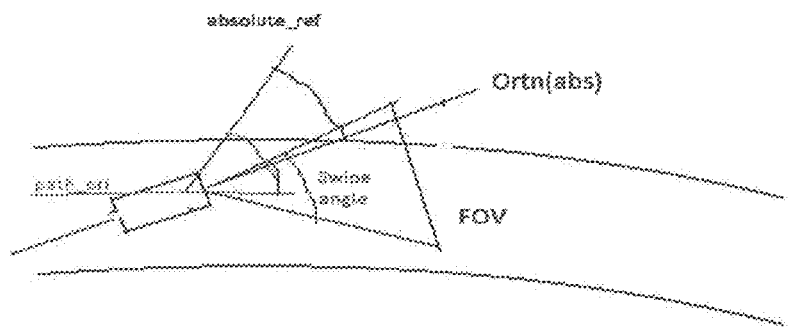
FIGS. 6A and 6B illustrate an exemplary derivation of a navigational FOV in accordance with some embodiments of the present disclosure.
Figure 6B:
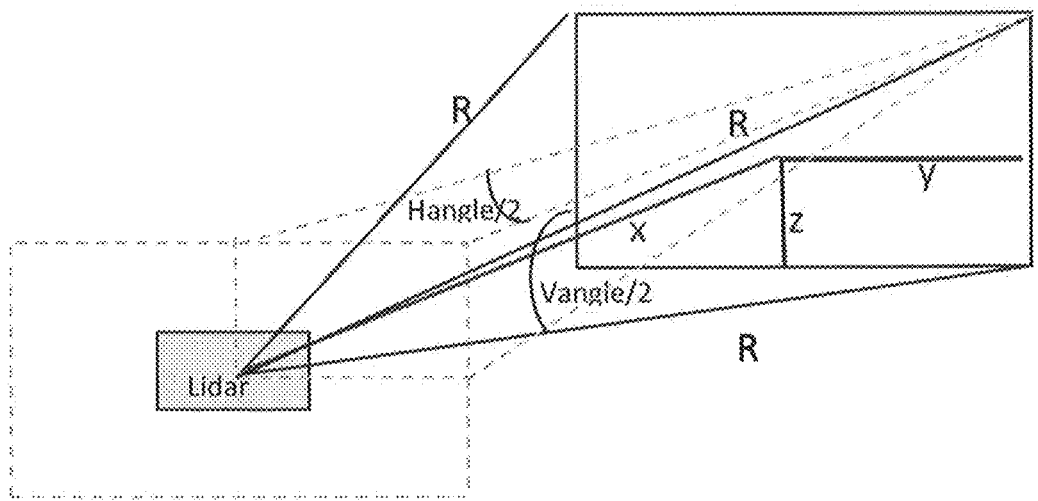

Referring now to FIGS. 6A and 6B, an exemplary derivation of the navigational FOV by processing the LIDAR data (Lidar$_{Data}$) at step 405 is illustrated in accordance with some embodiments of the present disclosure. The navigation device may first determine an approachable volumetric area (ApprVol$_{Area}$) with length (ApprV$_{length}$ or x), width (ApprV$_{width}$ or 2y), and height (ApprV$_{height}$ or 2z) based on vehicle orientation, path orientation, LIDAR range measurement capability, and LIDAR's ray projection alignment. The ray projection alignment may be determined based on a LIDAR beam elevation (vertical) angle (V$_{Angle}$) and a LIDAR beam azimuth (horizontal) angle (H$_{Angle}$).

For the determination of the LIDAR beam azimuth (horizontal) angle (H$_{Angle}$), the navigation device may determine an orientation deviation (Orntn$_{Dev}$) at vehicle's current localized position from the direction of the vehicle with respect to the basic navigation path. For the determination of the orientation deviation (Orntn$_{Dev}$), the navigation device may determine an absolute orientation (Orntn$_{abs}$) of vehicle (i.e., the orientation of the vehicle with respect to an absolute reference (absolute_ref)) based on the IMU data. Further, the navigation device may determine an absolute orientation (Orntn$_{path}$) of a segment of the base navigation path (i.e., the orientation of the base navigation path with respect to an absolute reference (absolute_ref)) from the vehicle's current position. This may be performed by selecting few points (at least two points) that may span over a suitable distance (say about 1 meter to about 4 meters) from vehicle's current position on the base navigation path, and fitting a straight line along the selected points. The absolute orientation (Orntn$_{path}$) of a segment of the base navigation path may then be compared with the absolute orientation (Orntn$_{abs}$) of vehicle to determine the orientation deviation (Orntn$_{Dev}$) as per equation (1) below:

$$\text{Orntn}_{Dev}=|\text{Orntn}_{path}-\text{Orntn}_{abs}| \qquad \text{Equation (1)}$$

Thus, in some embodiments, if the vehicle is supposed to be oriented exactly aligned on the base navigation path, but the IMU data provides different orientation then the difference shall be considered as Orntn$_{Dev}$. Further, based on the orientation deviation (Orntn$_{Dev}$) and the absolute orientation (Orntn$_{path}$) of the segment of the base navigation path, the navigation device may determine an angle of swipe of the LIDAR beam, also referred to as the LIDAR beam azimuth (horizontal) angle (H$_{Angle}$) as per equation (2) below:

$$H_{Angle}=(\text{Orntn}_{path}-\text{Orntn}_{Dev}) \text{ to } (\text{Orntn}_{path}+\text{Orntn}_{dev}) \qquad \text{Equation (2)}$$

The LIDAR beam azimuth (horizontal) angle (H$_{Angle}$) may enable the navigation device to center the path orientation. Further, the navigation device may select a LIDAR ring (having a radius R) from among the multiple rings of increasing radius (i.e., distance of ring from the vehicle's LIDAR position). In some embodiments, a distant ring (having greater radius R) may be selected for a lower $Orntn_{Dev}$, while a closer ring may be selected (having a smaller radius R) for higher $Orntn_{Dev}$. Further, the navigation device may determine the LIDAR beam elevation (vertical) angle ($V_{Angle}$) based on the vertical span of LIDAR beam at the selected LIDAR ring. The navigation device may then determine the length ($ApprV_{length}$ or x), the width ($ApprV_{width}$ or 2y), the height ($ApprV_{height}$ or 2z), and the approachable volumetric area ($ApprVol_{Area}$) as per equations (3)-(6) below:

$$x = R * \text{Cos}(V_{Angle/2}) * \text{Cos}(H_{Angle/2}) \quad \text{Equation (3)}$$

$$y = R * \text{Cos}(V_{Angle/2}) * \text{Sin}(H_{Angle/2}) \quad \text{Equation (4)}$$

$$x = R * \text{Sin}(V_{Angle/2}) \quad \text{Equation (5)}$$

$$ApprVol_{Area} = (x * 2y * 2z)/3 \quad \text{Equation (6)}$$

The navigation device may then filter navigation volume from the approachable volume such that navigational volume includes the drivable area (e.g., road) and structures or objects in the vicinity of the drivable area (buildings or trees on roadside). As will be appreciated, the navigational volume may represent the navigational FOV, which may then be further processed so as to generate the drivable navigation path in accordance with some embodiments of the present disclosure.

Referring back to FIGS. 4A and 4B, at step 406, the navigation device may generate data points cloud for the structures or objects on the non-drivable area or in the vicinity of the drivable area (e.g., roadside). At step 407, the generated data points cloud for the objects on the non-drivable area (e.g., roadside objects) may be filtered out from the data points cloud of the navigational FOV for identification of only the drivable area (e.g., road). This is achieved by measuring an elevation and/or a change of elevation of each data point along a certain LIDAR ring with respect to a base elevation for that LIDAR ring. As will be appreciated, the base elevation may be an elevation on which the surface of the drivable area may substantially adhere to. In some embodiments, the base elevation may be the vehicle's footprint height, which may be substantially at ground (+/−0,0 meter) and may be considered as reference height for computation of elevation for all the data points. As will be appreciated, the road boundaries, divider, or any other objects besides the road may typically produce point cloud at some height or at some low/declined heights (e.g., ponds or non-drivable sloppy terrain) than the base height or road surface height. The navigation device may therefore filter out all such points within the navigational FOV by measuring their elevation and/or a change of elevation with respect to the base elevation along a certain LIDAR ring (e.g. 1 to 16 or 32 numbers). The remaining data points cloud or the surface data points may be therefore at about same plane or base elevation for each LIDAR ring, and may be arranged in a near parallel straight line, with little curvature.

Figure 7:
FIG. 7 illustrates an exemplary surface data points and an exemplary navigational data points filtered from the navigational FOV in accordance with some embodiments of the present disclosure.

The navigation device may further approximate a substantially center point of each of the parallel lines (i.e., set of surface data points at about substantially same base elevation for each LIDAR ring). In some embodiments, the approximation may be performed by taking into consideration the end point co-ordinate for each of the line. These center points of each of the parallel LIDAR rings may be the navigational data points. Referring now to FIG. 7, an exemplary surface data points and an exemplary navigational data points filtered from the navigational FOV are illustrated in accordance with some embodiments of the present disclosure. As illustrated, the surface data points may be data points forming slightly curved parallel lines, as well as some of the data points on each side of the road that are at substantially same base level. As will be appreciated, the surface data points provide a clear indication of drivable area (e.g., road). Further, as illustrated, the navigational data points may be data points marked by cross at about the center of each of the parallel lines.

It should be noted that, if there may be a little slope in the drivable path itself, there may be a threshold value of slope per unit distance under consideration. Thus, by comparing the elevation of points of three consecutive ring's elevation, a decision may be taken if the slope is acceptable for driving of the autonomous vehicle. Additionally, a gross estimation of terrain condition may be determined. As will be appreciated, the decision with respect to driving the vehicle based on the terrain condition may be further augmented by terrain handling capability of the vehicle.

Further, it should be noted that, if any surface at the same plane of road run beside the road or just beyond a sharp curvature of road, where one or multiple LIDAR rings may be failing within the FOV, covering both road and non-road area, the surface data points beyond the LIDAR ring of concern may be filtered out. The navigation device may perform filtration of surface data points beyond the LIDAR ring of concern and road surface. For example, in some embodiments, the navigation device may start from the cross section of central directional line (generated by extrapolating the previously determined center points of parallel lines on road starting from vehicle) and the particular LIDAR ring of concern. The navigation device may then proceed in both left and right direction. Whenever a significant terrain elevation change from road surface may be observed, the navigation device may filter out all further points produced due to that ring. Additionally, the navigation device may determine a center point out of these ring points. Further the navigation device may determine center point of the ring segment, and may average out the center of the ring and the extrapolated point so as to determine the final center point on the ring, where the path should pass through.

Figure 8:
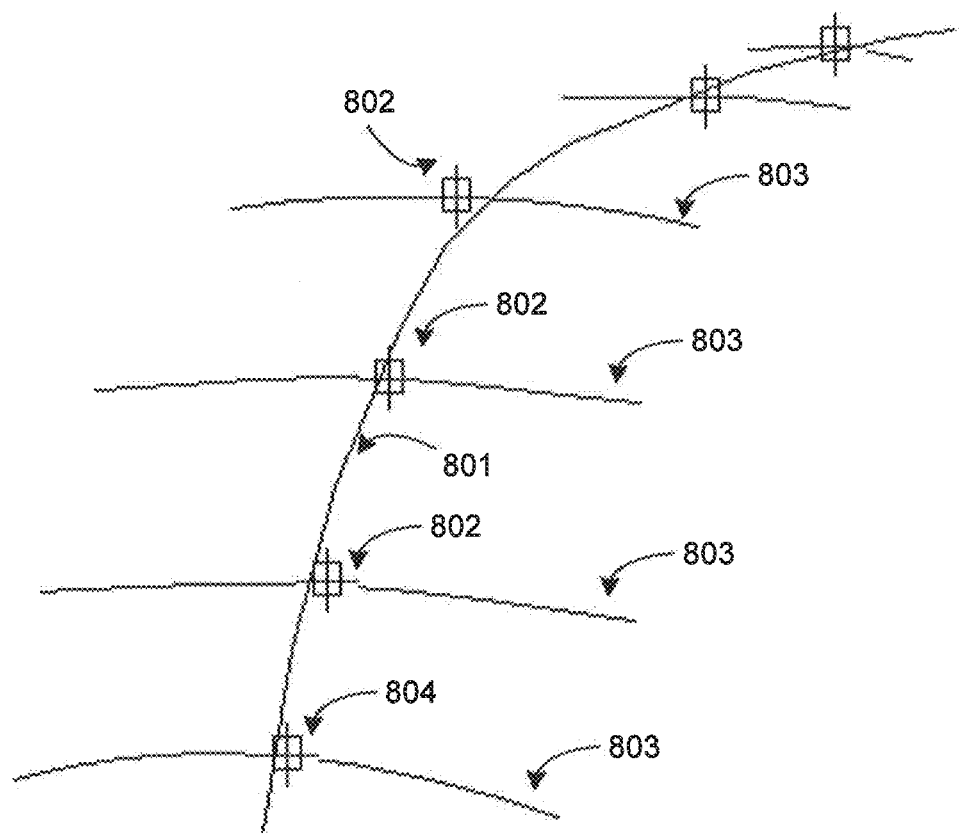
FIG. 8 illustrates an exemplary process for generating a portion of a drivable navigation path in accordance with some embodiments of the present disclosure.

Referring back to FIGS. 4A and 4B, at step 408, the navigation device may extract the data point cloud marking center of the drivable area. As stated above, these accumulated center points of each of the parallel LIDAR rings may be the navigational data points. At step 409, the navigation device may curve fit the navigational data points cloud so as to generate a drivable navigation path (LIDAR path). Referring now to FIG. 8, an exemplary process for generating a portion of a drivable navigation path 801 is illustrated in accordance with some embodiments of the present disclosure. The navigation device may extract the center point 802 for each near straight line segment 803. As stated above, in some embodiments, if any straight line 803 does not span up to full road boundary, due to unavailability of points because of obstruction of LIDAR vision or for some other reason, the center point 802 may be sifted at one side. The navigation device may therefore extract multiple such navigational data points 802 (one for each ring touching the road surface at different distance). Thus, an array of such navigational data points $Lidar_{point}$(East, North) may be available for path generation. The navigation device may then determine start point 804 ($Start_{point}$(East, North)) which is the current position of the vehicle. The navigation may further generate effective drivable navigation path 801 (PathEff(East, North))

with start point 804 (Start$_{Point}$(East, North)) and navigational data points Lidar$_{Point}$(East, North) 802 using quadratic curve fitting technique.

Referring back to FIGS. 4A and 4B, at step 410, the navigation device may perform line pattern matching for the drivable navigation path with the base navigation to determine a path segment of the drivable navigation path along with the input of vehicle (east, north) converted GPS location. For example, the navigation device may perform matching by effectively comparing each of the base navigation path points GPath$_{Points}$(East, North) with each of the drivable navigation path points PathEff(East, North). The navigation device may determine a distance between base path points and effective segment path point as array (Dist$_{BasePath\_Segment}$). The navigation device may further determine the minimum distance from the array (Dist$_{BasePath_{i},Segment}$). The navigation device may consider the points of PathEff(East, North) as the selected points. As both the path points are referred from same datum, point by point comparison may provide a suitable match when the navigation device may determine a lowest value for sum of square distance between points of two path.

Further, in some embodiments, the navigation device may convert the start position of the matched segment of the base navigation path to (latitude, longitude), and may provide the same to the map provider server so as to publish it as corrected localized position. For example, the navigation device may localize the vehicle at starting point Start$_{Point}$ (East, North) of GPath$_{Points}$(East, North). The navigation device may then convert the starting point GPath$_{Points}$(East, North) in the geographic coordinate system by determining latitude (G_Lat) and longitude (G_Long) using UTM-WGS$_{84}$ converter. Further, the navigation device may publish the converted starting point Start$_{Point}$(East, North) as localized (latitude, longitude) position for the vehicle. At step 411, the navigation device may generate command velocity based on the drivable navigation path. In particular, once the navigation path segment is determined at step 410, the navigation device may generate the command velocity.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
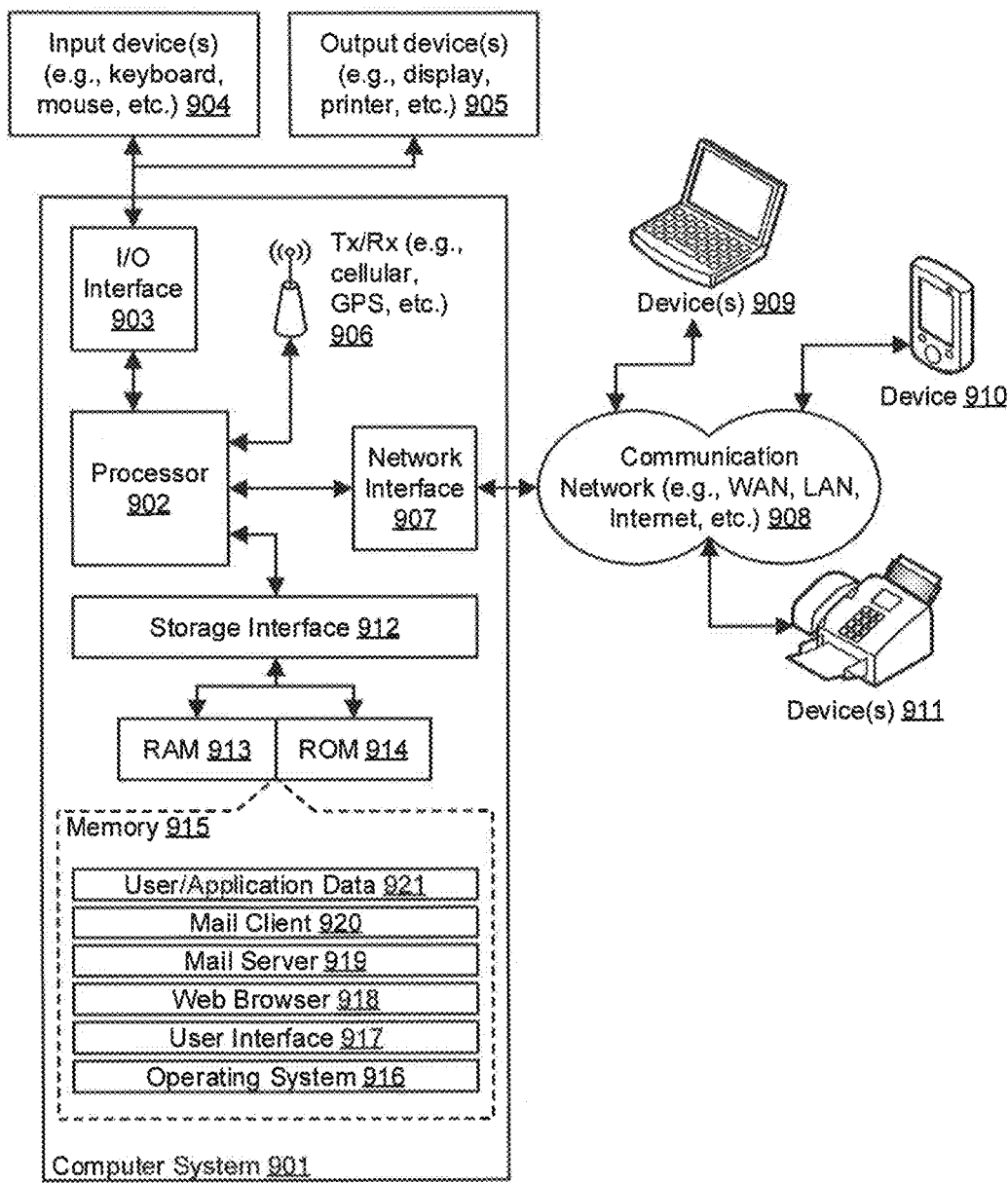
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, a block diagram of an exemplary computer system 901 for implementing embodiments consistent with the present disclosure is illustrated. Variations of computer system 901 may be used for implementing system 100 and drivable navigation path determination engine 200 for determining a drivable navigation path for an autonomous vehicle. Computer system 901 may include a central processing unit ("CPU" or "processor") 902. Processor 902 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer system 901 may communicate with devices 909, 910, and 911. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 901 may itself embody one or more of these devices.

In some embodiments, the processor 902 may be disposed in communication with one or more memory devices (e.g., RAM 913, ROM 914, etc.), collectively referred to as memory 915, via a storage interface 912. The storage interface 912 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 915 may store a collection of program or database components, including, without limitation, an operating system 916, user interface application 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, strollers, windows, widgets, etc. Graphical user interfaces (GUIs) may be employed, including, without limitation, Apple Macintosh operating systems' Aqua, IBM OS/2, Microsoft. Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 901 may implement a web browser 918 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 901 may implement a mail server 919 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 901 may implement a mail client 920 stored program component. The mail client may be a mail viewing application, such as Apple Mail, Microsoft Entourage, Microsoft Outlook, Mozilla Thunderbird, etc.

In some embodiments, computer system 901 may store user/application data 921, such as the data, variables, records, etc. (e.g., navigation map, base navigation path, GPS data, converted GPS data, IMU data, LIDAR data, featured data points cloud, surface data points cloud, navigational data points cloud, drivable navigation path, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above may provide for a drivable navigation path for an autonomous vehicle in an efficient and cost effective manner. The techniques may employ a standard high level navigation path on a standard navigation map provided by any service provider (that may provide turn by turn way-point path based on its satellite map) and dynamically acquired sensor data of the environment (e.g., LIDAR data, GPS data, IMU data, etc.) provided by sensor system fitted in the vehicle so as to provide the drivable navigation path to the vehicle. It should be noted that the drivable navigation path from source to destination may be determined in segmented manner based on the sensor's look-ahead distance.

The techniques may further provide for navigation path correction on navigation map using real-time environment data (acquired via sensors such as LIDAR scanner, GPS sensor, and IMU). The techniques may calculate the latitude, longitude, altitude (if any) of data points on the real-time map derived from sensor data, and may determine the offset of the data points with respect to the data points of high level standard map (which may not be very accurate). If the offset is above or below a certain threshold, then the techniques may perform required correction so as to generate the corrected path. Moreover, in some embodiments, the techniques may provide for the LIDAR map using the collected. LIDAR data and may provide for the overlaid corrected path on the standard map using LIDAR map.

The specification has described system and method for determining a drivable navigation path for an autonomous vehicle. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for determining a drivable navigation path for an autonomous vehicle, the method comprising:
   receiving, by a navigation device, a base navigation path on a navigation map, a position and an orientation of the autonomous vehicle with respect to the base navigation path, and an environmental field of view (FOV);
   deriving, by the navigation device, a navigational FOV based on the environmental FOV, the base navigation path, and the orientation of the vehicle, wherein deriving the navigational FOV comprises determining an approachable volume based on a plurality of geometrical parameters of the environmental FOV, an orientation of the base navigation path, and the orientation of the autonomous vehicle, wherein determining the approachable volume comprises determining a deviation in the orientation based on the orientation of the base navigation path and the orientation of the autonomous vehicle and determining a scope of the environmental FOV based on the deviation;
   determining, by the navigation device, a set of navigational data points from the navigational FOV; and
   generating, by the navigation device, at least a portion of the drivable navigation path for the autonomous vehicle based on the set of navigational data points.

2. The method of claim 1, wherein the base navigation path is received from a global positioning system (GPS) based navigation path service provider, wherein the position of the autonomous vehicle is received from a GPS sensor, wherein the orientation of the autonomous vehicle is received from an inertia measurement unit (IMU), and wherein the environmental FOV is received from a light detection and ranging (LIDAR) scanner.

3. The method of claim 1, wherein the plurality of geometrical parameters comprises a range of LIDAR measurement, a horizontal angle of LIDAR beam elevation, a vertical angle of LIDAR beam elevation, and a height of LIDAR from the ground.

4. The method of claim 1, further comprising filtering a navigational volume from the approachable volume, wherein the navigational volume comprises a drivable area and a plurality of non-drivable structures in the vicinity of the drivable area.

5. The method of claim 1, wherein determining the set of navigational data points comprises:
   determining a plurality of data points within the navigational FOV;
   along each of a plurality of pre-determined distance intervals in the navigational FOV, filtering a plurality of surface data points from the plurality of data points based on their corresponding elevation level and their corresponding base elevation level, wherein a base elevation level is an elevation on which the surface of the drivable navigation path substantially adhere to:
   along each of a plurality of pre-determined distance intervals in the navigational FOV, filtering the set of navigational data points from the plurality of surface data points based on their corresponding substantially central positions.

6. The method of claim 1, wherein generating at least the portion of the drivable navigation path comprises curve fitting along the set of navigational data points.

7. The method of claim 1, further comprising navigating the autonomous vehicle based on at least the portion of the drivable navigation path.

8. The method of claim 7, wherein navigating the autonomous vehicle comprises:
   determining an offset between at least the portion of the drivable navigation path and a corresponding portion of the base navigation path; and
   correcting the navigation of the autonomous vehicle based on the base navigation path and the offset.

9. A system for determining a drivable navigation path for an autonomous vehicle, the system comprising:
   a navigation device comprising at least one processor and a computer-readable medium storing instructions that, when executed by the at least one processor, cause the at least one processor to:
   receive a base navigation path on a navigation map, a position and an orientation of the autonomous vehicle with respect to the base navigation path, and an environmental field of view (FOV);
   derive a navigational FOV based on the environmental FOV, the base navigation path, and the orientation of the vehicle, wherein deriving the navigational FOV comprises determining an approachable volume based on a plurality of geometrical parameters of the environmental FOV, an orientation of the base navigation path, and the orientation of the autonomous vehicle, wherein determining the approachable volume comprises determining a deviation in the orientation based on the orientation of the base navigation path and the orientation of the autonomous vehicle and determining a scope of the environmental FOV based on the deviation;
   determine a set of navigational data points from the navigational FOV; and
   generate at least a portion of the drivable navigation path for the autonomous vehicle based on the set of navigational data points.

10. The system of claim 9, wherein the base navigation path is received from a global positioning system (GPS) based navigation path service provider, wherein the position of the autonomous vehicle is received from a GPS sensor, wherein the orientation of the autonomous vehicle is received from an inertia measurement unit (IMU), and wherein the environmental FOV is received from a light detection and ranging (LIDAR) scanner.

11. The system of claim 9, wherein the operations further comprise filtering a navigational volume from the approachable volume, wherein the navigational volume comprises a drivable area and a plurality of non-drivable structures in the vicinity of the drivable area.

12. The system of claim 9, wherein determining the set of navigational data points comprises:
  determining a plurality of data points within the navigational FOV;
  along each of a plurality of pre-determined distance intervals in the navigational FOV, filtering a plurality of surface data points from the plurality of data points based on their corresponding elevation level and their corresponding base elevation level, wherein a base elevation level is an elevation on which the surface of the drivable navigation path substantially adhere to;
  along each of a plurality of pre-determined distance intervals in the navigational FOV filtering the set of navigational data points from the plurality of surface data points based on their corresponding substantially central positions.

13. The system of claim 9, wherein generating at least the portion of the drivable navigation path comprises curve fitting along the set of navigational data points.

14. The system of claim 9, wherein the operations further comprise navigating the autonomous vehicle based on at least the portion of the drivable navigation path.

15. The system of claim 14, wherein navigating the autonomous vehicle comprises:

determining an offset between at least the portion of the drivable navigation path and a corresponding portion of the base navigation path; and
  correcting the navigation of the autonomous vehicle based on the base navigation path and the offset.

16. A non-transitory computer-readable medium storing computer-executable instructions for:
  receiving a base navigation path on a navigation map, a position and an orientation of the autonomous vehicle with respect to the base navigation path, and an environmental field of view (FOV);
  deriving a navigational FOV based on the environmental FOV, the base navigation path, and the orientation of the vehicle, wherein deriving the navigational FOV comprises determining an approachable volume based on a plurality of geometrical parameters of the environmental FOV, an orientation of the base navigation path, and the orientation of the autonomous vehicle, wherein determining the approachable volume comprises determining a deviation in the orientation based on the orientation of the base navigation path and the orientation of the autonomous vehicle and determining a scope of the environmental FOV based on the deviation;
  determining a set of navigational data points from the navigational FOV; and
  generating at least a portion of the drivable navigation path for the autonomous vehicle based on the set of navigational data points.

* * * * *